United States Patent
Nilsson et al.

(10) Patent No.: US 11,928,331 B2
(45) Date of Patent: Mar. 12, 2024

(54) SYSTEM AND METHOD FOR MANAGING THE STORING OF DATA IN A VEHICLE

(71) Applicant: Ningbo Geely Automobile Research & Development Co., Ltd., Ningbo (CN)

(72) Inventors: Magnus Nilsson, Floda (SE); Erik Lindberg Nilsson, Gothenburg (SE)

(73) Assignee: NINGBO GEELY AUTOMOBILE RESEARCH & DEV. CO., LTD., Ningbo (CN)

( * ) Notice: Subject to any disclaimer, the term of this patent is extended or adjusted under 35 U.S.C. 154(b) by 196 days.

(21) Appl. No.: 17/531,724

(22) Filed: Nov. 20, 2021

(65) Prior Publication Data

US 2022/0083225 A1 Mar. 17, 2022

Related U.S. Application Data

(63) Continuation of application No. PCT/CN2020/088881, filed on May 7, 2020.

(30) Foreign Application Priority Data

May 29, 2019 (EP) .................................... 19177361

(51) Int. Cl.
G06F 3/06 (2006.01)

(52) U.S. Cl.
CPC .......... G06F 3/0604 (2013.01); G06F 3/0655 (2013.01); G06F 3/0673 (2013.01)

(58) Field of Classification Search
CPC .... G06F 3/0604; G06F 3/0655; G06F 3/0673; G06Q 30/06; G06Q 10/02; G06Q 50/30; G06Q 50/188; G08G 1/202
(Continued)

(56) References Cited

U.S. PATENT DOCUMENTS 10,453,107 B2 * 10/2019 Roche ................... G06Q 10/02
2001/0044664 A1   11/2001 Mueller
(Continued)

FOREIGN PATENT DOCUMENTS

| CN | 101246476 A |   | 8/2008 |
| CN | 102158503 A | * | 8/2011 |

(Continued)

OTHER PUBLICATIONS

Yamada et al, "Implementation and Evaluation of Data Management Methods for Vehicle Control Systems", 2011, [Online], pp. 1-5, [Retrieved from internet on Nov. 10, 2023], <https://ieeexplore.ieee.org/stamp/stamp.jsp?arnumber=6093147>, (Year: 2011).*

(Continued)

Primary Examiner — S. Sough
Assistant Examiner — Zengpu Wei
(74) Attorney, Agent, or Firm — Tucker Ellis LLP (57) ABSTRACT

A system, method and computer program product for managing the storing of data before usage of at least a first vehicle. The method includes receiving an indication of at least a first user library data file desired to be locally stored in at least a first vehicle memory for future use by a user, determining if the at least first user library data file matches at least a first vehicle library data file already stored in the at least first vehicle memory, and downloading, the at least first user library data file not already stored in the at least first vehicle memory of the at least first vehicle.

13 Claims, 4 Drawing Sheets

(58) Field of Classification Search
USPC .............................................. 717/171; 705/5
See application file for complete search history.

(56) References Cited

U.S. PATENT DOCUMENTS

| | | | |
|---|---|---|---|
| 2004/0249663 A1 | 12/2004 | Shishido | |
| 2011/0167460 A1 | 7/2011 | Tranchina | |
| 2011/0181796 A1 | 7/2011 | Caltabiano | |
| 2014/0310739 A1* | 10/2014 | Ricci | G06Q 20/321 |
| | | | 725/75 |
| 2018/0201226 A1* | 7/2018 | Falkson | B60R 25/257 |
| 2019/0279440 A1* | 9/2019 | Ricci | H04W 4/48 |
| 2019/0385452 A1* | 12/2019 | Nangeroni | G08G 1/202 |
| 2020/0065087 A1* | 2/2020 | Miura | H04L 67/34 |

FOREIGN PATENT DOCUMENTS

| | | | | |
|---|---|---|---|---|
| CN | 105933855 A | | 9/2016 | |
| CN | 106534367 A | * | 3/2017 | ............ H04L 67/06 |
| CN | 104185036 B | * | 8/2018 | |
| JP | 2002041060 A | | 2/2002 | |
| JP | 2002341875 A | | 11/2002 | |
| JP | 2002351475 A | | 12/2002 | |
| JP | 2007038779 A | * | 2/2007 | |

OTHER PUBLICATIONS

International Search Report from corresponding International Application No. PCT/CN2020/088881, dated Jul. 29, 2020, 2 pages.

* cited by examiner

SYSTEM AND METHOD FOR MANAGING THE STORING OF DATA IN A VEHICLE

RELATED APPLICATION DATA

This application is a continuation of International Patent Application No. PCT/CN2020/088881, filed May 7, 2020, which claims the benefit of European Patent Application No. 19177361.3, filed May 29, 2019, the disclosures of which are incorporated herein by reference in their entireties.

TECHNICAL FIELD

The disclosure pertains to the field of managing a request for reservation of a vehicle and storing of data in a vehicle.

BACKGROUND

Today it is desired for vehicle occupants to have access to data files that they normally have access to when they are not in a vehicle. For example, vehicle occupants may want to listen to music and podcasts, and passengers may want to watch movies when they are travelling in the vehicle. Access to desired data files are dependent on where the data file is stored. Data files stored in a memory that is in the vehicle does not require Internet access while data files that are stored in a remote memory that is not in the vehicle require Internet access in order to access the data files. Internet access to a vehicle is dependent on the geographical location of the vehicle. Internet access can be provided e.g. by wire, if the vehicle is parked, but if the vehicle is moving, Internet access can be provided via a wireless communication network. The access to the wireless communication network is dependent on the infrastructure of the wireless communication network. In rural areas that wireless communication network may be slower and sometimes difficult to access. In more dense areas, such as in cities, the wireless communication network may be faster and more reliable. The access to a wireless communication network may also de dependent on the subscription, and when e.g. going abroad, accessing the wireless communication network may be associated with an increased cost an can be more or less expensive. If a data file needs to be downloaded or streamed over the Internet, the network capability, the speed and bandwidth of the wireless communication network will affect the experience of the vehicle occupants when consuming the data file. For example, if the capability of the wireless communication network suddenly drops, it may cause a movie to pause or to displayed with less resolution.

Vehicles are also sometimes used by different vehicle occupants over time. There are for example rental cars, and there are vehicles that are in e.g. so called car pools, that are shared among a plurality of different vehicle occupants.

SUMMARY

There is a demand for a more reliable and effective way of getting access to data files for vehicle occupants. There is also a demand for minimizing the usage of communication networks, and minimizing the transfer of data files over communication networks, in particular over wireless communication networks. There is a desire to get a reliable access to data files, without the need for a communication network, and to lower cost for transferring data files over communication networks. The inventors have identified that there are sometimes data files that does not need to be sent over communication networks from a remote memory to a vehicle memory of the vehicle, if a copy of the data file already exists in the vehicle memory of the vehicle. This minimizes the need for transferring the data file, which in turn reduce the usage of the communication network. The inventors have also identified that there is a demand for transferring data files from a remote memory in a cost effective, and capability effective way, in order to provide the data file to the vehicle so that it can be accessible by the vehicle occupant in the future of the vehicle.

An object of the present disclosure is to provide vehicle data management system and method for managing the storing of data before usage of at least a first vehicle which seek to mitigate, alleviate, or eliminate one or more of the above-identified deficiencies in the art and disadvantages singly or in any combination.

The disclosure proposes a vehicle data management system for managing the storing of data before usage of at least a first vehicle. The vehicle data management system comprises at least a first electronic device for managing a reservation of the at least first vehicle and at least a first vehicle memory for storing local data in the at least first vehicle. The vehicle data management system further comprises a processing circuitry operatively connected to the at least first vehicle memory and the at least first electronic device. The processing circuitry is configured to cause the vehicle data management system to receive an indication of at least a first user library data file desired to be locally stored in the at least first vehicle memory for future use by a user and determine if the at least first user library data file matches at least a first vehicle library data file already stored in the at least first vehicle memory. The processing circuitry is further configured to cause the vehicle data management system to download, to the at least first vehicle memory, the at least first user library data file not already stored in the at least first vehicle memory of the at least first vehicle. An advantage with the vehicle data management system is that a transfer of a first user library data file that is already existing in the at least first vehicle memory of the at least first vehicle can be avoided, which in turn will free capacity of, and reduce the cost for using, the communication network for transferring data files to the at least first vehicle.

According to an aspect the processing circuitry is further configured to cause the vehicle data management system to receive a request for reservation of the at least first vehicle for future use of the at least first vehicle by a user, and determine the availability of the at least first vehicle based on the request for reservation of the at least first vehicle and based on at least a first match of the at least a first user library data file and the at least a first vehicle library data file already stored in the at least first vehicle memory. This means that when the availability of the at least first vehicle is determined, not only the time when at least a first vehicle is available is considered, but also if data can be reused in order to avoid transfer of a first user library data file that is already existing in the at least first vehicle memory of the at least first vehicle.

According to an aspect the processing circuitry is further configured to cause the vehicle data management system to determine the geographical location of the at least first vehicle and determine a data transfer capability between at least a first communication module of the vehicle and a communication network dependent on the geographical location of the at least first vehicle. An advantage with this aspect is that the vehicle data management system becomes aware of the transfer capability at a certain geographical location which in turn makes it possible to plan for when and where to transfer data.

According to an aspect the processing circuitry is further configured to cause the vehicle data management system to determine the time needed for downloading the at least first user library data file to the vehicle memory. This means that the vehicle data management system becomes aware of the time needed for downloading the at least first user library data file which in turn makes it possible to plan for when to transfer the at least first user library data file to the vehicle memory.

According to an aspect the processing circuitry is further configured to cause the vehicle data management system to determine a downloading scheme for downloading of the at least first user library data file to the at least first vehicle memory, wherein the downloading scheme is dependent on the location of the at least first vehicle and the data transfer capability between the communication module of the at least first vehicle and the communication network at the geographical location of the at least first vehicle. An advantage with the downloading scheme is that the at least first user library data file can be planned to be downloaded at certain geographical locations at certain times, in order to avoid downloading the at least first user library data file at geographical locations with e.g. low bandwidth of the communication network or when the cost for using the communication network is high.

According to an aspect the downloading scheme is further dependent on the time needed for downloading the at least first user library data file to the vehicle memory. According to an aspect the downloading scheme is further dependent on a cost associated with the downloading of the at least first user library data file to the vehicle memory via the at least first communication network. In other words, the time needed for downloading the at least first user library data file can be taken in consideration to e.g. make sure that the at least first user library data file can be downloaded before the at least first vehicle is present at the certain geographical location in order to utilize the communication network at geographical locations with e.g. high bandwidth of the communication network or when the cost for using the communication network is low.

According to an aspect the downloading scheme is further dependent on a current usage the at least first vehicle for avoiding disturbance of any ongoing data transfer initiated by the current user of the at least first vehicle. An advantage with this aspect is that in a determination that the at least first vehicle is in use by vehicle occupant at a certain point of time in the future, the downloading of the at least first user library data file to the vehicle memory can be planned not to occur during this certain point of time in the future, to prioritize transfer of data for the vehicle occupant that is using the at least first vehicle at the point of time in the future.

According to an aspect the availability of the at least first vehicle is dependent on the data amount of the at least first user library data file not already stored in the at least first vehicle memory of the at least first vehicle. An advantage with this aspect is that the amount of data that needs to be transferred can be minimized even if e.g. it is determined that there are a number of user library data files that matches the vehicle library data files since in an example it can be the amount of data, and not the number of files, that influence the needed usage of the communication network.

The disclosure further discloses a method for managing the storing of data before usage of at least a first vehicle. The method comprising the step of receiving an indication of at least a first user library data file desired to be locally stored in at least a first vehicle memory for future use by a user and the step of determining if the at least first user library data file matches at least a first vehicle library data file already stored in the at least first vehicle memory. The method further comprising the step of downloading, to the at least first vehicle memory, the at least first user library data file not already stored in the at least first vehicle memory of the at least first vehicle. An advantage with the method is that a transfer of a first user library data file that is already existing in the at least first vehicle memory of the at least first vehicle can be avoided, which in turn will free capacity of, and reduce the cost for using, the communication network for transferring data files to the at least first vehicle.

According to an aspect the method further comprising the step of receiving a request for reservation of the at least first vehicle for future use of the at least first vehicle by a user, and the step of determining the availability of the at least first vehicle based on the request for reservation of the at least first vehicle and based on at least a first match of the at least a first user library data file and the at least a first vehicle library data file already stored in the at least first vehicle memory. This means that when the availability of the at least first vehicle is determined, not only the time when at least a first vehicle is available is considered, but also if data can be reused in order to avoid transfer of a first user library data file that is already existing in the at least first vehicle memory of the at least first vehicle.

According to an aspect the method further comprising the step of determining the geographical location of the at least first vehicle, and the step of determining a data transfer capability between at least a first communication module of the vehicle and at least a communication network dependent on the geographical location of the at least first vehicle. An advantage with this aspect is that the vehicle data management system becomes aware of the transfer capability at a certain geographical location which in turn makes it possible to plan for when and where to transfer data.

According to an aspect the method further comprising the step of determining the time needed for downloading the at least first user library data file to the vehicle memory. This means that the vehicle data management system becomes aware of the time needed for downloading the at least first user library data file which in turn makes it possible to plan for when to transfer the at least first user library data file to the vehicle memory.

According to an aspect the method further comprising the step of determining a downloading scheme for downloading of the at least first user library data file to the at least first vehicle memory, wherein the downloading scheme is dependent on the location of the at least first vehicle and the data transfer capability between the communication module of the at least first vehicle and the communication network at the geographical location of the at least first vehicle. An advantage with the downloading scheme is that the at least first user library data file can be planned to be downloaded at certain geographical locations at certain times, in order to avoid downloading the at least first user library data file at geographical locations with e.g. low bandwidth of the communication network or when the cost for using the communication network is high.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

There is a demand for a more reliable and effective way of getting access to data files for vehicle occupants. There is also a demand for minimizing the usage of communication networks, and minimizing the transfer of data files over communication networks, in particular over wireless communication networks. There is a desire to get a reliable access to data files, without the need for a communication network, and to lower cost for transferring data files over communication networks. There is also a desire to secure that the data files are stored in the vehicle before using the vehicle and hence available when the user gets to the vehicle. The inventors have identified that there are sometimes data files that does not need to be sent over communication networks from a remote memory to a vehicle memory of the vehicle, if a copy of the data file already exists in the vehicle memory of the vehicle. This minimizes the need for transferring the data file, which in turn reduce the usage of the communication network. The inventors have also identified that there is a demand for transferring data files from a remote memory in a cost effective, and capability effective way, in order to provide the data file to the vehicle so that it can be accessible by the vehicle occupant in the future of the vehicle.

An object of the present disclosure is to provide vehicle data management system and method for managing the storing of data before usage of at least a first vehicle which seek to mitigate, alleviate, or eliminate one or more of the above-identified deficiencies in the art and disadvantages singly or in any combination.

Figure 1:
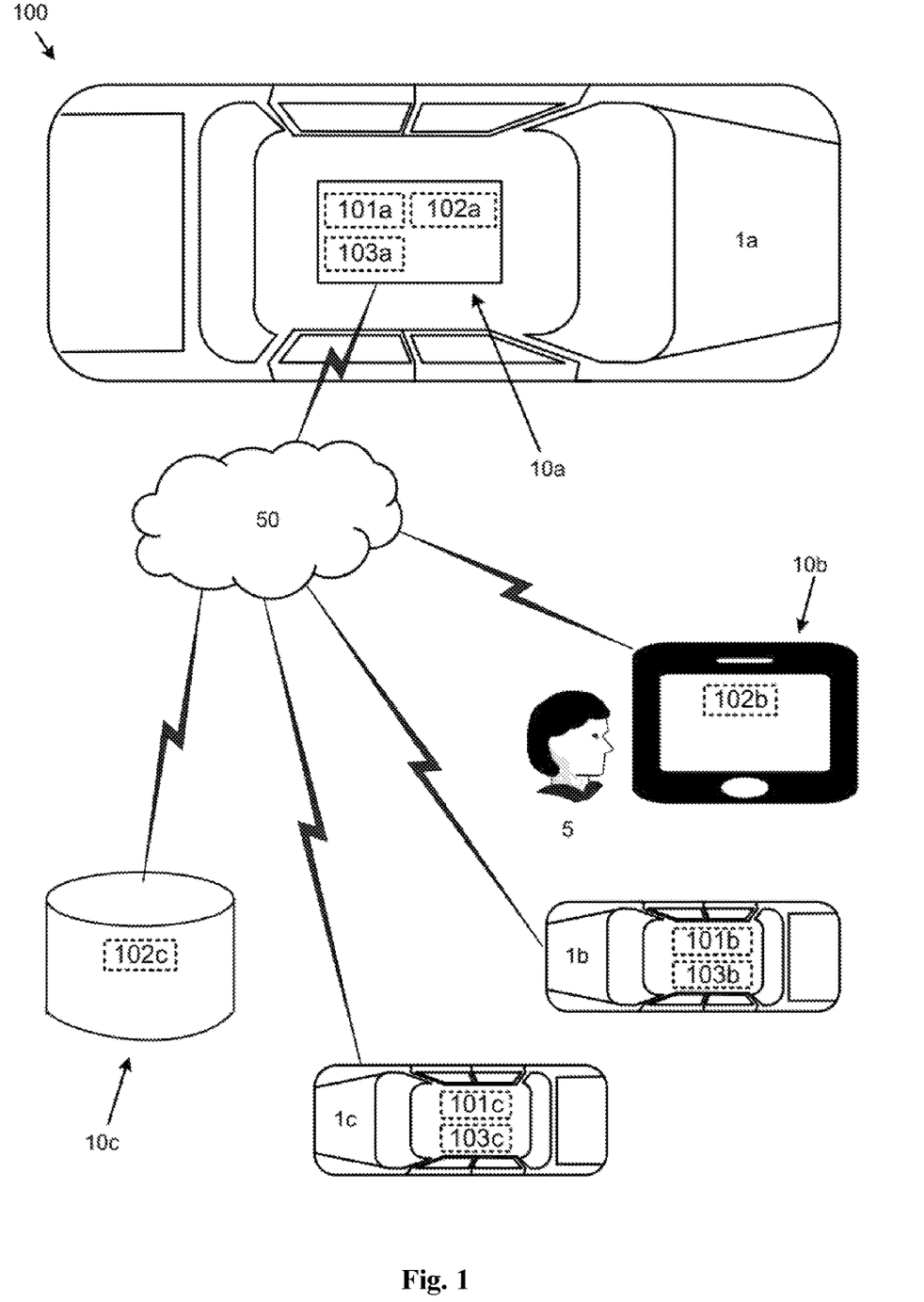
FIG. 1 illustrates an overview of the vehicle data management system according to an aspect of the disclosure.

As illustrated in FIG. 1, the disclosure proposes a vehicle data management system 100 for managing the storing of data before usage of at least a first vehicle 1a, 1b, 1c. The vehicle data management system 100 comprises at least a first electronic device 10a, 10b, 10c for managing a reservation of the at least first vehicle 1a, 1b, 1c. According to an aspect the electronic device 10a is an on-board computer integrated in the at least first vehicle 1a, 1b, 1c. According to an aspect the electronic device is a portable electronic device 10b. In an example the portable electronic device 10b is a smartphone or a tablet. According to an aspect the electronic device is a remote server 10c. In an example the remote server 10c is a vehicle reservation server at e.g. a vehicle reservation service provider.

The vehicle data management system 100 further comprises at least a first vehicle memory 101a, 101b, 101c for storing local data in the at least first vehicle 1a, 1b, 1c. According to an aspect the least first vehicle memory 101a, 101b, 101c is the memory of the on-board computer of the at least a first vehicle 1a, 1b, 1c. According to an aspect the at least first vehicle memory 101a, 101b, 101c is a separate memory device for storing of data before usage of at least a first vehicle 1a, 1b, 1c.

The vehicle data management system 100 further comprises a processing circuitry 102a, 102b, 102c operatively connected to the at least first vehicle memory 101a, 101b, 101c and the at least first electronic device 10a, 10b, 10c. As illustrated in FIG. 1, the processing circuitry 102a, 102b, 102c can be comprised in any of the illustrated electronic devices 10a, 10b, 10c and operatively connected to the at least first vehicle memory 101a, 101b, 101c. According to an aspect the processing circuitry 102a, 102b, 102c is operatively connected to the at least first vehicle memory 101a, 101b, 101c and the at least first electronic device 10a, 10b, 10c via a communication network 50. According to an aspect the at least first vehicle 1a, 1b, 1c comprises at least a first communication module 103a, 103b, 103c. According to an aspect the at least first vehicle 1a, 1b, 1c is configured to communicate with the communication network 50 via the at least a first communication module 103a, 103b, 103c. According to an aspect the least first vehicle memory 101a, 101b, 101c is connected to the communication network 50 via the at least a first communication module 103a, 103b, 103c.

The communication network 50 is illustrated in FIG. 1. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-Internet of Things, NB-IoT, Third Generation, 3G, Fourth Generation, 4G, Fifth Generation 5G, Worldwide Interoperability for Microwave Access, WiMAX or Ultra Mobile Broadband, UMB or similar network. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network.

The communication network 50 can also be a combination of both a local area network and a wide area network. The communication network 50 can also be wired networks. According to an aspect of the disclosure, the communication network 50 is defined by common Internet Protocols.

The data transfer capability of the communication network 50 can vary dependent on a plurality of reasons such as available bandwidth, current ongoing data transfer, possible data transfer congestions, data transfer restrictions, communication network subscription restrictions etc. In the case the communication network is a wireless network, such as a standardized wireless wide area network or a standardized wireless local area network, the data transfer capability between the at least first communication module 103a, 103b, 103c of the vehicle 1a, 1b, 1c and the communication network 50 can vary dependent on the radio interface between the at least first communication module 103a, 103b, 103c and the communication network 50 and can then further be dependent on e.g. radio propagation, radio coverage, radio interference etc.

The processing circuitry 102a, 102b, 102c is configured to cause the vehicle data management system 100 to receive an indication of at least a first user library data file ul1, ul2, ul3, ul4 desired to be locally stored in the at least first vehicle memory 101a, 101b, 101c for future use by a user 5. According to an aspect the indication of the at least first user library data file ul1, ul2, ul3, ul4 is included in a request for reservation of the at least first vehicle 1a, 1b, 1c for future use of the at least first vehicle 1a, 1b, 1c by a user 10. According to an aspect the indication of the at least first user library data file ul1, ul2, ul3, ul4 comprises at least a first association data identifying the at least first user library data file ul1, ul2, ul3, ul4. The processing circuitry 102a, 102b, 102c is further configured to determine if the at least first user library data file ul1, ul2, ul3, ul4 matches at least a first vehicle library data file vl1, vl2, vl3, vl4 already stored in the at least first vehicle memory 101a, 101b, 101c.

Figure 2:
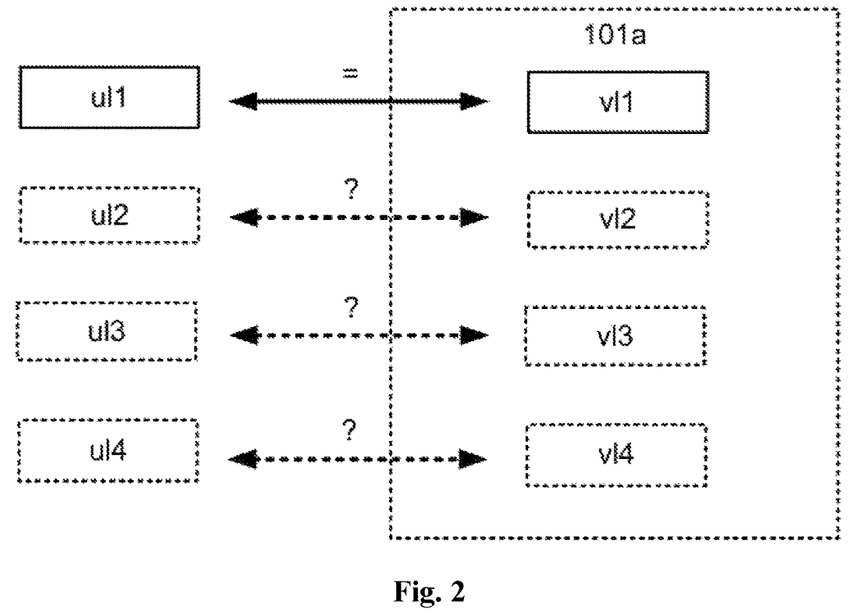
FIG. 2 illustrates an example of matching data files already stored in the at least first vehicle memory according to an aspect of the disclosure.

According to an aspect any of the at least first user library data file ul1, ul2, ul3, ul4 and the at least first vehicle library data file vl1, vl2, vl3, vl4 are identified by meta data that is associated with the at least first user library data file ul1, ul2, ul3, ul4 and the at least first vehicle library data file vl1, vl2, vl3, vl4 respectively. According to an aspect the metadata is data providing information about any of the at least first user library data file ul1, ul2, ul3, ul4 and the at least first vehicle library data file vl1, vl2, vl3, vl4. According to an aspect the meta data is at least any of a title, an artist or actor name, a group, an album name, a series name, an episode title, a keyword, a time data, a genre, a language, a game name, a software version, a computer program, a geographical information etc. In an example, as illustrated in FIG. 2, the first user library data file ul1 is a movie file, with metadata comprising a certain series title and an episode title e.g. "Band of Brothers" and "02 Day of Days". In the same example, as illustrated in FIG. 2, the first vehicle library data file vl1 is also movie file with the same metadata comprising the certain series title and the episode title e.g. "Band of Brothers" and "02 Day of Days". In the example it is hence determined that the at least first user library data file ul1 matches at least a first vehicle library data file vl1 already stored in the at least first vehicle memory 101a. In the example as illustrated in FIG. 2, all the remaining user library data files ul2, ul3, ul4 are compared with the remaining vehicle library data files vl2, vl3, vl4 to determine if any of the user library data files ul2, ul3, ul4 matches the vehicle library data files vl2, vl3, vl4 already stored in the at least first vehicle memory 101a. FIG. 2 illustrates a schematic principle. According to an aspect the at least first user library data file ul1, ul2, ul3, ul4 is stored in at least a first remote memory outside of the at least first vehicle 1a, 1b, 1c. In an example the at least first user library data file ul1, ul2, ul3, ul4 is associated with at least a data file stored on a remote server by a service provider associated with the user 5. In an example the user may have the rights to use a certain data file stored on a remote server by the service provider. In an example the data file is associated with digital rights management information that e.g. enables the data file to be stored in the at least first vehicle memory 101a, 101b, 101c for future use within a certain limited time by the user 5.

The processing circuitry 102a, 102b, 102c is further configured to cause the vehicle data management system 100 to download, to the at least first vehicle memory 101a, 101b, 101c, the at least first user library data file ul1, ul2, ul3, ul4 not already stored in the at least first vehicle memory 101a, 101b, 101c of the at least first vehicle 1a, 1b, 1c. An advantage with the vehicle data management system 100 is that a transfer, e.g. by downloading, of a first user library data file ul1, ul2, ul3, ul4 that is already existing in the at least first vehicle memory 101a, 101b, 101c of the at least first vehicle 1a, 1b, 1c can be avoided, which in turn will free capacity of, and reduce the cost for using, the communication network 50 for transferring data files to the at least first vehicle memory 101a, 101b, 101c of the at least first vehicle 1a, 1b, 1c.

According to an aspect the processing circuitry 102a, 102b, 102c is further configured to cause the vehicle data management system 100 to receive a request for reservation of the at least first vehicle 1a, 1b, 1c for future use of the at least first vehicle 1a, 1b, 1c by a user 5. According to an aspect the request for reservation comprising an indicated time period. According to an aspect the request for reservation comprising a pick up time and a return time. According to an aspect the request for reservation comprising a pick up location and a return location. In an example the time period is at least any of indication of a certain day, a certain time of the day. According to an aspect the request for reservation comprising request for a certain vehicle type.

According to an aspect the processing circuitry 102a, 102b, 102c is further configured to determine the availability of the at least first vehicle 1a, 1b, 1c based on the request for reservation of the at least first vehicle 1a, 1b, 1c and based on at least a first match of the at least a first user library data file ul1, ul2, ul3, ul4 and the at least a first vehicle library data file vl1, vl2, vl3, vl4 already stored in the at least first vehicle memory 101a, 101b, 101c. This means that when the availability of the at least first vehicle 1a, 1b, 1c is determined, not only the time when at least a first vehicle 1a, 1b, 1c is available is considered, but also if data can be reused in order to avoid transfer of a first user library data file ul1, ul2, ul3, ul4 that is already existing in the at least first vehicle memory 101a, 101b, 101c of the at least first vehicle 1a, 1b, 1c.

According to an aspect determining the availability of the at least first vehicle 1a, 1b, 1c comprising determining if the user 5 has reserved the at least first vehicle 1a, 1b, 1c before. According to an aspect determining the availability of the at least first vehicle 1a, 1b, 1c comprising determining the availability of the at least first vehicle 1a, 1b, 1c at the pickup location and the pickup time.

According to an aspect determining the availability of the at least first vehicle 1a, 1b, 1c comprising prioritizing reserving the at least first vehicle 1a, 1b, 1c being available longest time ahead before the pickup time.

According to an aspect the processing circuitry 102a, 102b, 102c is further configured to cause the vehicle data management system 100 to determine the geographical location of the at least first vehicle 1a, 1b, 1c and determine a data transfer capability between at least a first communication module 103a, 103b, 103c of the at least first vehicle 1a, 1b, 1c and at least a communication network 50 dependent on the geographical location of the at least first vehicle 1a, 1b, 1c. An advantage with this aspect is that the vehicle data management system 100 becomes aware of the transfer capability at a certain geographical location which in turn makes it possible to plan for when and where to transfer data.

Figure 3:
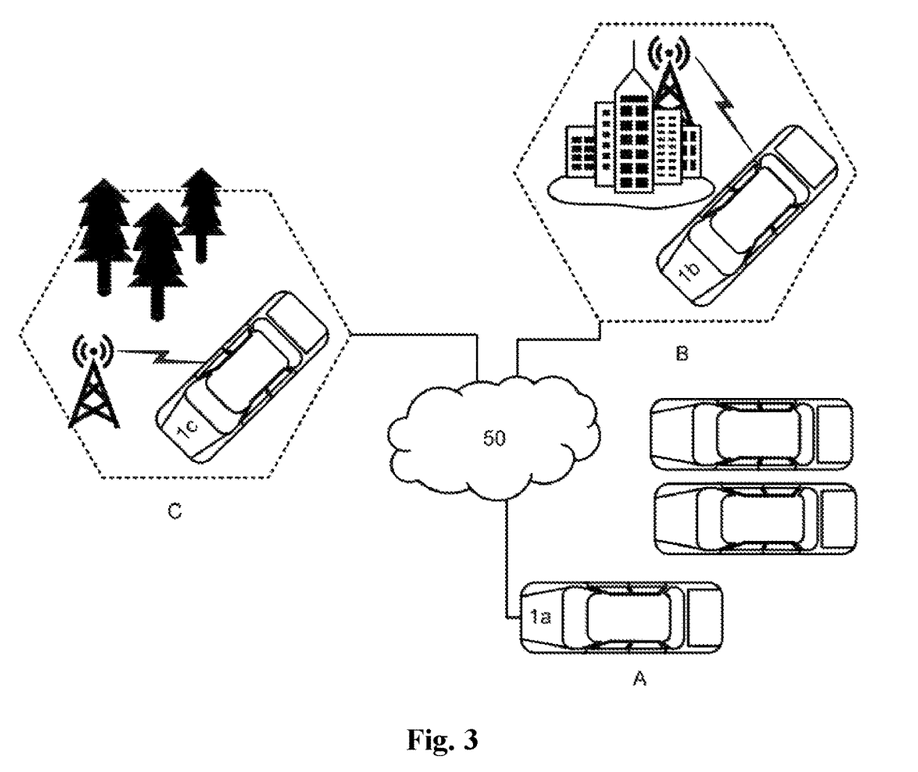
FIG. 3 illustrates an overview of the vehicle data management system with vehicles at different geographical locations according to an aspect of the disclosure.

FIG. 3 illustrates an overview of the vehicle data management system 100 with vehicles at different geographical locations according to an aspect of the disclosure. According to an aspect the geographical location of the at least first vehicle 1a, 1b, 1c is determined by a global positioning service receiver installed in the at least first vehicle 1a, 1b, 1c. According to an aspect the geographical location of the at least first vehicle 1a, 1b, 1c is determined by the connection to the communication network 50. According to an aspect the geographical location of the at least first vehicle 1a, 1b, 1c is determined by a wire connection to the communication network 50.

In the example in FIG. 3 the vehicle 1a is at a car rental station at the geographical location A, and e.g. connected to a charger for charging the battery of the vehicle 1a. The vehicle 1b is in a city, at the geographical location B, e.g. on route within the city. The vehicle 1c is in a forest, at the geographical location C. The data transfer capability between at least a first communication module 103a, 103b, 103c of the at least first vehicle 1a, 1b, 1c the communication network 50 is dependent on the geographical location of the at least first vehicle 1a, 1b, 1c. In the example of FIG. 3, the data transfer capability between the communication module 103a of the vehicle 1a and the communication network 50 at the car rental station, geographical location A, is very high via a wired fiber connection to the vehicle 1a. In the example of FIG. 3, the data transfer capability between the communication module 103b of the vehicle 1b and the communication network 50 in the city, geographical location B, is high via a modern generation of wireless connection to the vehicle 1b. Further, in the example of FIG. 3, the data transfer capability between the communication module 103c of the vehicle 1c and the communication network 50 at in the forest, geographical location C, is very low via an old generation of wireless connection to the vehicle 1c.

According to an aspect the processing circuitry 102a, 102b, 102c is further configured to cause the vehicle data management system 100 to determine the time needed for downloading the at least first user library data file ul1, ul2, ul3, ul4 to the vehicle memory 101a, 101b, 101c. This means that the vehicle data management system 100 becomes aware of the time needed for downloading the at least first user library data file ul1, ul2, ul3, ul4 which in turn makes it possible to plan for when to transfer the at least first user library data file ul1, ul2, ul3, ul4 to the vehicle memory 101a, 101b, 101c. In an example the time needed for downloading the at least first user library data file ul1, ul2, ul3, ul4 to the vehicle memory 101a, 101b, 101c is used for deciding on if downloading should be initiated or not. In the example given in FIG. 3 it may be determined that the vehicle 1b in the city, will be on route within the city for the next 30 minutes and within the radio coverage of the modern generation of wireless connection to the vehicle 1b. This may cause the downloading of the at least first user library data file ul1, ul2, ul3, ul4 to start, since it is determined that there is sufficient of time and good connection to the communication network 50 to download the at least first user library data file ul1, ul2, ul3, ul4 to the vehicle 1b.

In an example it is determined that all the vehicles 1a, 1b and 1c, are all available a certain time period matching a request for reservation of the at least first vehicle 1a, 1b, 1c. Further, for all the vehicles 1a, 1b and 1c there is match of a first user library data file ul1 and a first vehicle library data file vl1 already stored in the memory 101a, 101b, 101c of each vehicle 1a, 1b, 1c respectively. In the example it is determined that further user library data files ul2, ul3, ul4 are desired to be downloaded to any of the vehicles 1a, 1b, 1c in order to prepare that vehicle 1a, 1b, 1c before usage of the vehicle. In the example of FIG. 3, it is determined that the vehicle 1a is most suitable for being reserved according to the request, since the data transfer capability between the communication module 103a of the vehicle 1a and the communication network 50 at the car rental station, geographical location A, is very high via the wired fiber connection to the vehicle 1a. In the example the vehicle 1a is therefore reserved and the remaining user library data files ul2, ul3, ul4, that are of huge size, are downloaded to the vehicle 1a.

In another example, also with reference to FIG. 3, it is determined that vehicle 1c matches all user library data files ul1, ul2, ul3 except a user library data file ul4 of very small size. It is also determined that vehicle 1c is being available longest time ahead before the pickup time, and therefore it is determined that even if the data transfer capability between the communication module 103c of the vehicle 1c and the communication network 50 in the forest, at geographical location C, is very low via the old generation of wireless connection to the vehicle 1c, it is still more efficient from a data transfer point of view to reserve and prepare the vehicle 1c by downloading the reaming user library data file ul4.

According to an aspect the processing circuitry 102a, 102b, 102c is further configured to cause the vehicle data management system 100 to determine a downloading scheme for downloading of the at least first user library data file ul1, ul2, ul3, ul4 to the at least first vehicle memory 101a, 101b, 101c, wherein the downloading scheme is dependent on the location of the at least first vehicle 1a, 1b, 1c and the data transfer capability between the communication module 103a, 103b, 103c of the at least first vehicle 1a, 1b, 1c and the communication network 50 at the geographical location of the at least first vehicle 1a, 1b, 1c. An advantage with the downloading scheme is that the at least first user library data file ul1, ul2, ul3, ul4 can be planned to be downloaded at certain geographical locations at certain times, in order to avoid downloading the at least first user library data file ul1, ul2, ul3, ul4 at geographical locations with e.g. low bandwidth of the communication network or when the cost for using the communication network is high. According to an aspect determining the availability of the at least first vehicle 1a, 1b, 1c comprising prioritizing reserving the at least first vehicle 1a, 1b, 1c being available longest time ahead before the pickup time in order to fit in the downloading scheme.

The downloading scheme is dependent on the location of the vehicle 1a and the data transfer capability between the communication module 103a of the vehicle 1a and the communication network 50 at the geographical location of the vehicle 1a. According to an aspect information regarding future geographical location of the vehicle 1a is accessible to the vehicle data management system 100. In an example future geographical location of the vehicle 1a can be geographical location information associated with current reservations of the vehicle 1a, or geographical location information associated with planned routes of the vehicle 1a. In further examples, the future geographical location of the vehicle 1a can be geographical location information associated with time at a service station, such as a charging station or a car rental station.

According to an aspect the downloading scheme is further dependent on the time needed for downloading the at least first user library data file ul1, ul2, ul3, ul4 to the vehicle memory 101a, 101b, 101c. According to an aspect the downloading scheme is further dependent on a cost associated with the downloading of the at least first user library data file ul1, ul2, ul3, ul4 to the vehicle memory 101a, 101b, 101c via the at least first communication network 50b, 50c. In other words, the time needed for downloading the at least first user library data file ul1, ul2, ul3, ul4 can be taken in consideration to e.g. make sure that the at least first user library data file ul1, ul2, ul3, ul4 can be downloaded before the at least first vehicle 1a, 1b, 1c is present at the certain geographical location in order to utilize the communication network at geographical locations with e.g. high bandwidth of the communication network or when the cost for using the communication network is low. In an example the cost is dependent on a subscription to get access to the communication network. In an example the cost can be higher when e.g. a vehicle is abroad and not in the home communication network. In an example cost is associated with quality of service, and the cost for quality of service for transferring data over the communication network 50 is higher for a certain quality of service and lower for a certain quality of service.

According to an aspect the downloading scheme is further dependent on a current usage the at least first vehicle 1a, 1b, 1c for avoiding disturbance of any ongoing data transfer initiated by the current user of the at least first vehicle 1a, 1b, 1c. An advantage with this aspect is that in a determination that the at least first vehicle 1a, 1b, 1c is in use by vehicle occupant at a certain point of time in the future, the downloading of the at least first user library data file ul1, ul2, ul3, ul4 to the vehicle memory 101a, 101b, 101c can be planned not to occur during this certain point of time in the future, to prioritize transfer of data for the vehicle occupant that is using the at least first vehicle 1a, 1b, 1c at the point of time in the future.

According to an aspect the availability of the at least first vehicle 1a, 1b, 1c is dependent on the data amount of the at least first user library data file ul1, ul2, ul3, ul4 not already stored in the at least first vehicle memory 101a, 101b, 101c of the at least first vehicle 1a, 1b, 1c. An advantage with this aspect is that the amount of data that needs to be transferred can be minimized even if e.g. it is determined that there are a number of user library data files ul1, ul2, ul3, ul4 that matches the vehicle library data files vl1, vl2, vl3, vl4 since it is the amount of data, and not the number of files, that influence the needed usage of the communication network 50.

According to an aspect the vehicle data management system 100 is configured to delete user library data files ul1, ul2, ul3, ul4 stored in at least first vehicle memory 101a, 101b, 101c, and vehicle library data files vl1, vl2, vl3, vl4 stored in the at least first vehicle memory 101a, 101b, 101c. The files are for example deleted in order to free memory space for future user library data files ul1, ul2, ul3, ul4 to be downloaded and stored in the at least first vehicle memory 101a, 101b, 101c. According to an aspect the user library data files ul1, ul2, ul3, ul4 stored in at least first vehicle memory 101a, 101b, 101c and vehicle library data files vl1, vl2, vl3, vl4 stored in the at least first vehicle memory 101a, 101b, 101c are deleted at a time that is after the reservation time of the at least first vehicle 1a, 1b, 1c by certain user 10. In an example the user library data files ul1, ul2, ul3, ul4 stored in at least first vehicle memory 101a, 101b, 101c and vehicle library data files vl1, vl2, vl3, vl4 stored in the at least first vehicle memory 101a, 101b, 101c are not deleted if any of the files are in a future request for reservation of the at least first vehicle 1a, 1b, 1c received by the vehicle data management system 100.

According to an aspect user library data files ul1, ul2, ul3, ul4 stored in at least first vehicle memory 101a, 101b, 101c and vehicle library data files vl1, vl2, vl3, vl4 stored in the at least first vehicle memory 101a, 101b, 101c that are frequently used by users reserving the at least first vehicle 1a, 1b, 1c are deleted as late as possible in order to minimize future downloading of user library data files ul1, ul2, ul3, ul4.

Figure 6:
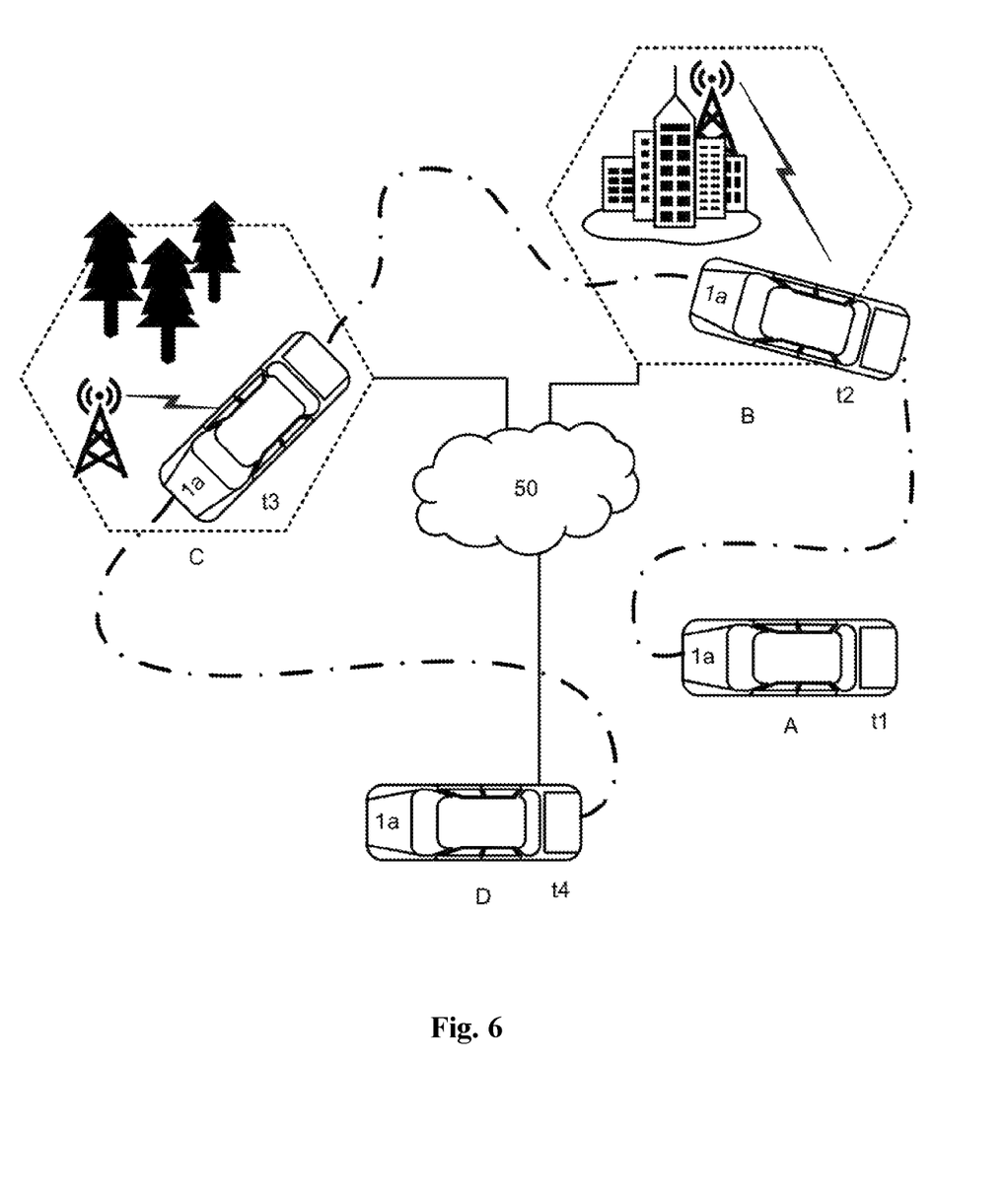
FIG. 6 illustrates an example use case of a vehicle at different geographical locations according to an aspect of the disclosure.

In a use case example, as illustrated in FIG. 6, it is determined that the vehicle 1a is being available longest time ahead before the pickup time according to the request for reservation of the at least first vehicle 1a, 1b, 1c. It is also determined that the data amount of the user library data files ul1, ul2, ul3, ul4, not already stored in the vehicle memory 101a of the vehicle 1a, is the least among the available vehicles to be reserved the certain time period according to the request for reservation. It is however determined that a number of user library data files needs to be downloaded to the vehicle memory of vehicle 1a. In order to prepare the vehicle 1a, a downloading scheme for downloading of the user library data files to the vehicle memory is determined. In the example as illustrated in FIG. 6, information regarding future geographical location of the vehicle 1a is accessible to the vehicle data management system 100. In the illustration the vehicle 1a is planned to be at the geographical location A at time t1, at the geographical location B in the city at time t2, at the geographical location C in the forest at time t3, and finally at the geographical location D the car rental station at time t4. In the example, vehicle 1a is only planned to be at the car rental station a very short time t4 before the next reservation. It is planned that the vehicle 1a will be at the geographical location B, in the city, for a number of days. The downloading scheme is therefore adapted so that downloading of the user library data files is initiated when the vehicle 1a is at the geographical location B in the city at time t2. In particular it is determined to initiate downloading during night while the vehicle 1a is not planned to be used by the current user of the vehicle 1a. In the example it is also determined that there will be no downloading of user library files while the vehicle 1a is at the geographical location C, in the forest, at time t3 due to high costs and low data transfer capability. In the example the vehicle 1a arrives at the geographical location D the car rental station at time t4, with all the desired user library data files downloaded into the vehicle memory of vehicle 1a. In an example the downloaded user library data files (ul1, ul2, ul3, ul4), and the vehicle library data files (vl1, vl2, vl3, vl4) already stored in the vehicle memory (101a) that matches the desired user library data files, can be displayed to the user 5 on a display in the vehicle 1a at the beginning of the reservation time, when the user 5 begins to use the vehicle 1a. This gives the user 5 comfort in that the desired files are stored and accessible from the vehicle memory (101a) without the need for an Internet access.

Figure 4:
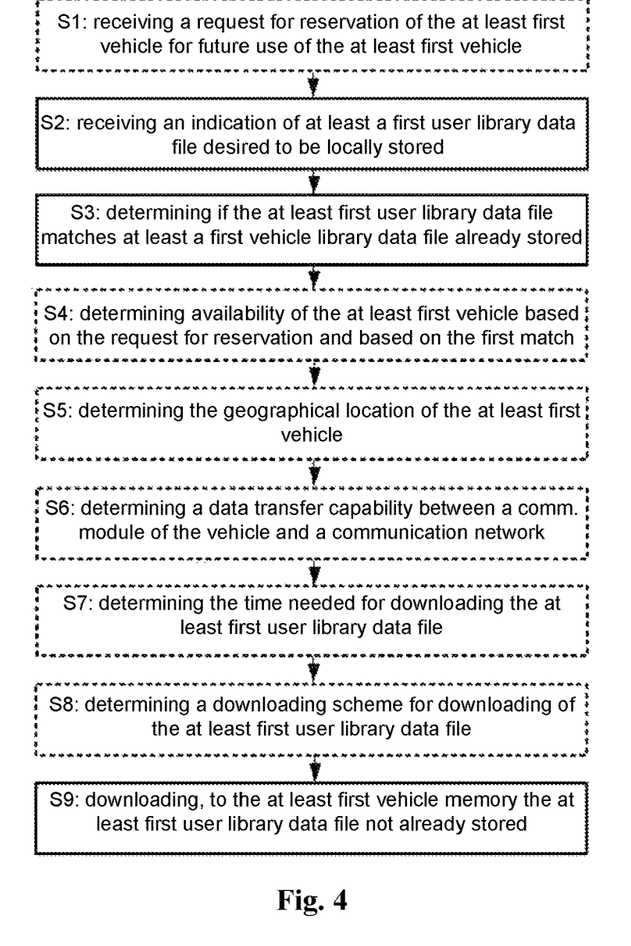
FIG. 4 illustrates a flow chart of the method steps according to some aspects of the disclosure.

With additional reference to FIG. 4, the disclosure further discloses a method for managing the storing of data before usage of at least a first vehicle 1a, 1b, 1c. According to an aspect vehicle data management system 100 is configured to carry out any or more of the aspects of the method. The method comprising the step of S2 receiving an indication of at least a first user library data file ul1, ul2, ul3, ul4 desired to be locally stored in at least a first vehicle memory 101a, 101b, 101c for future use by a user 10 and the step of S3 determining if the at least first user library data file ul1, ul2, ul3, ul4 matches at least a first vehicle library data file vl1, vl2, vl3, vl4 already stored in the at least first vehicle memory 101a, 101b, 101c. The method further comprising the step of S9 downloading, to the at least first vehicle memory 101a, 101b, 101c, the at least first user library data file ul1, ul2, ul3, ul4 not already stored in the at least first vehicle memory 101a, 101b, 101c of the at least first vehicle 1a, 1b, 1c. An advantage with the method is that a transfer of a first user library data file ul1, ul2, ul3, ul4 that is already existing in the at least first vehicle memory 101a, 101b, 101c of the at least first vehicle 1a, 1b, 1c can be avoided, which in turn will free capacity of, and reduce the cost for using, the communication network for transferring data files to the at least first vehicle 1a, 1b, 1c.

According to an aspect the method further comprising the step of S1 receiving a request for reservation of the at least first vehicle 1a, 1b, 1c for future use of the at least first vehicle 1a, 1b, 1c by a user 5, and the step of S4 determining the availability of the at least first vehicle 1a, 1b, 1c based on the request for reservation of the at least first vehicle 1a, 1b, 1c and based on at least a first match of the at least a first user library data file ul1, ul2, ul3, ul4 and the at least a first vehicle library data file vl1, vl2, vl3, vl4 already stored in the at least first vehicle memory 101a, 101b, 101c. This means that when the availability of the at least first vehicle 1a, 1b, 1c is determined, not only the time when at least a first vehicle 1a, 1b, 1c is available is considered, but also if data can be reused in order to avoid transfer of a first user library data file ul1, ul2, ul3, ul4 that is already existing in the at least first vehicle memory 101a, 101b, 101c of the at least first vehicle 1a, 1b, 1c.

According to an aspect the method further comprising the step of S5 determining the geographical location of the at least first vehicle 1a, 1b, 1c, and the step of S6 determining a data transfer capability between at least a first communication module 103a, 103b, 103c of the vehicle 1a, 1b, 1c and at least a communication network 50 dependent on the geographical location of the at least first vehicle 1a, 1b, 1c. An advantage with this aspect is that the vehicle data management system 100 becomes aware of the transfer capability at a certain geographical location which in turn makes it possible to plan for when and where to transfer data.

According to an aspect the method further comprising the step of S7 determining the time needed for downloading the at least first user library data file ul1, ul2, ul3, ul4 to the vehicle memory 101a, 101b, 101c. This means that the vehicle data management system 100 becomes aware of the time needed for downloading the at least first user library data file ul1, ul2, ul3, ul4 which in turn makes it possible to plan for when to transfer the at least first user library data file ul1, ul2, ul3, ul4 to the vehicle memory 101a, 101b, 101c.

According to an aspect the method further comprising the step of S8 determining a downloading scheme for downloading of the at least first user library data file ul1, ul2, ul3, ul4 to the at least first vehicle memory 101a, 101b, 101c, wherein the downloading scheme is dependent on the location of the at least first vehicle 1a, 1b, 1c and the data transfer capability between the communication module 103a, 103b, 103c of the at least first vehicle 1a, 1b, 1c and the communication network 50 at the geographical location of the at least first vehicle 1a, 1b, 1c. An advantage with the downloading scheme is that the at least first user library data file ul1, ul2, ul3, ul4 can be planned to be downloaded at certain geographical locations at certain times, in order to avoid downloading the at least first user library data file ul1, ul2, ul3, ul4 at geographical locations with e.g. low bandwidth of the communication network or when the cost for using the communication network is high.

Figure 5:
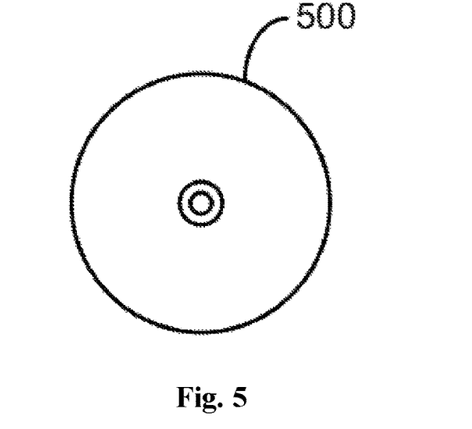
FIG. 5 illustrates a computer program product according to some aspects of the disclosure.

The disclosure further proposes, as illustrated in FIG. 5, a computer program product 500 comprising a non-transitory computer readable medium, having thereon a computer program comprising program instructions, the computer program being loadable into a processing circuitry 102a, 102b, 102c and configured to cause execution of the method when the computer program is run by the at least one processing circuitry 102a, 102b, 102c.

According to an aspect vehicle data management system 100 is configured to carry out any or more of the aspects of the described method. According to an aspect of the disclosure, the method is carried out by instructions in a software program that is downloaded and run in the vehicle data management system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:
1. A vehicle data management system for managing storing of data before usage of at least a first vehicle, the vehicle data management system comprises:
at least a first electronic device for managing a reservation of the at least first vehicle;
at least a first vehicle memory for storing local data in the at least first vehicle; and a processing circuitry operatively connected to the at least first vehicle memory and the at least first electronic device configured to cause the vehicle data management system to:
- receive an indication of at least a first user library data file desired to be locally stored in the at least first vehicle memory for future use by a user;
- determine if the at least first user library data file matches at least a first vehicle library data file already stored in the at least first vehicle memory wherein the at least first user library data file and the at least first vehicle library data file are identified by meta data that is associated with the at least first user library data file and the at least first vehicle library data file respectively; and
- download, to the at least first vehicle memory, the at least first user library data file not already stored in the at least first vehicle memory of the at least first vehicle; and wherein the processing circuitry is further configured to cause the vehicle data management system to:
receive a request for reservation of the at least first vehicle for future use of the at least first vehicle by a user; and
determine availability of the at least first vehicle based on the request for reservation of the at least first vehicle and based on at least a first match of the at least a first user library data file and the at least a first vehicle library data file already stored in the at least first vehicle memory.

2. The vehicle data management system according to claim 1, wherein the processing circuitry is further configured to cause the vehicle data management system to:
- determine a geographical location of the at least first vehicle; and
- determine a data transfer capability between at least a first communication module of the at least first vehicle and a communication network dependent on the geographical location of the at least first vehicle.

3. The vehicle data management system according to claim 1, wherein the processing circuitry is further configured to cause the vehicle data management system to:
- determine a time needed for downloading the at least first user library data file to the at least first vehicle memory.

4. The vehicle data management system according to claim 1, wherein the processing circuitry is further configured to cause the vehicle data management system to:
- determine a downloading scheme for downloading of the at least first user library data file to the at least first vehicle memory, wherein the downloading scheme is dependent on a location of the at least first vehicle and a data transfer capability between a communication module of the at least first vehicle and a communication network at a geographical location of the at least first vehicle.

5. The vehicle data management system according to claim 4, wherein the downloading scheme is further dependent on a time needed for downloading the at least first user library data file to the at least first vehicle memory.

6. The vehicle data management system according to claim 4, wherein the downloading scheme is further dependent on a cost associated with the downloading of the at least first user library data file to the at least first vehicle memory via the communication network.

7. The vehicle data management system according to claim 4, wherein the downloading scheme is further dependent on a current usage of the at least first vehicle for avoiding disturbance of any ongoing data transfer initiated by a current user of the at least first vehicle.

8. The vehicle data management system according to claim 1, wherein the availability of the at least first vehicle is dependent on a data amount of the at least first user library data file not already stored in the at least first vehicle memory of the at least first vehicle.

9. A method for managing storing of data before usage of at least a first vehicle, the method comprising:
- receiving an indication of at least a first user library data file desired to be locally stored in at least a first vehicle memory for future use by a user determining if the at least first user library data file matches at least a first vehicle library data file already stored in the at least first vehicle memory wherein the at least first user library data file and the at least first vehicle library data file are identified by meta data that is associated with the at least first user library data file and the at least first vehicle library data file respectively;
- downloading, to the at least first vehicle memory, the at least first user library data file not already stored in the at least first vehicle memory of the at least first vehicle;
- receiving a request for reservation of the at least first vehicle for future use of the at least first vehicle by a user; and
- determining availability of the at least first vehicle based on the request for reservation of the at least first vehicle and based on at least a first match of the at least a first user library data file and the at least a first vehicle library data file already stored in the at least first vehicle memory.

10. The method according to claim 9, further comprising:
- determining a geographical location of the at least first vehicle; and
- determining a data transfer capability between at least a first communication module of the at least first vehicle and at least a communication network dependent on the geographical location of the at least first vehicle.

11. The method according to claim 9, further comprising:
- determining a time needed for downloading the at least first user library data file to the at least first vehicle memory.

12. The method according to claim 9, further comprising:
- determining a downloading scheme for downloading of the at least first user library data file to the at least first vehicle memory, wherein the downloading scheme is dependent on a location of the at least first vehicle and a data transfer capability between a communication module of the at least first vehicle and a communication network at a geographical location of the at least first vehicle.

13. A computer program product comprising a non-transitory computer readable medium, having thereon a computer program comprising program instructions, the computer program being loadable into a processing circuitry and configured to cause execution of the method according to claim 9 when the computer program is run by the processing circuitry.

* * * * *